Nov. 3, 1936.  K. RABE  2,059,908
SPRINGING ARRANGEMENT FOR VEHICLES
Filed March 12, 1936
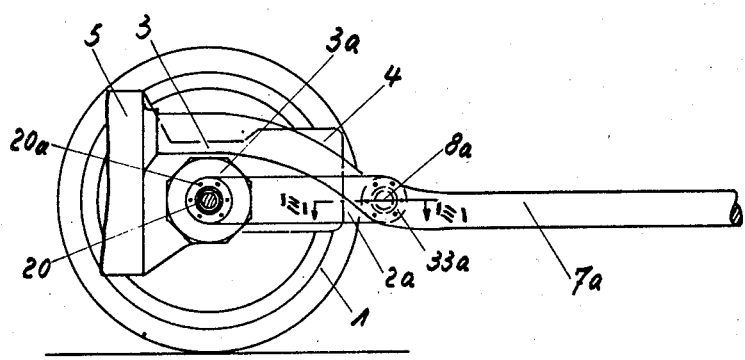
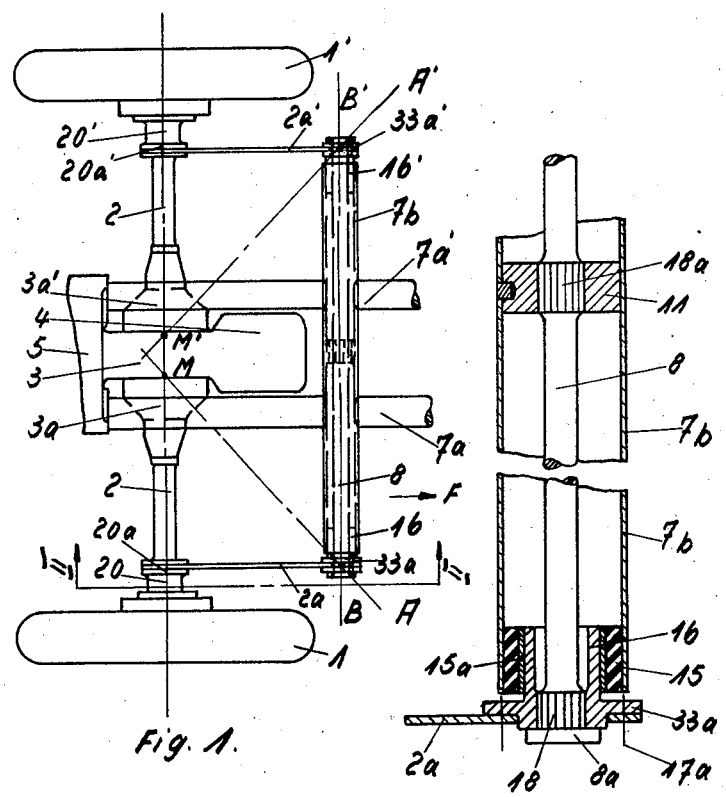

Patented Nov. 3, 1936

2,059,908

UNITED STATES PATENT OFFICE 2,059,908

SPRINGING ARRANGEMENT FOR VEHICLES

Karl Rabe, Stuttgart, Germany

Application March 12, 1936, Serial No. 68,437
In Germany March 22, 1935

12 Claims. (Cl. 267—57)

This invention relates to improvements in springing arrangements for vehicles and has particular relation to constructions utilizing rotary spring devices the axes of which are located outside of the axis of oscillation of the road wheel or other sprung member. The suggestion has already been made that in such constructions a universal joint be provided between rotary springs, such as a torsion bar, and the sprung member to permit these parts to oscillate about different axes.

It is an object of this invention to improve upon and simplify prior devices and particularly to provide a construction in which the complication and expense of universal joints are eliminated.

Another object of the invention is to provide a torsionally elastic member between the spring member and the sprung member to permit oscillation to said members about different axes.

Another object is to provide a member connecting a spring member with a sprung member, such as a swinging half axle, which connecting means is torsionally resilient, capable of resisting tensile and compressive stresses resulting from traction and braking and at the same time is substantially rigid against the bending moments occurring therein as a result of the spring reaction.

Another object of the invention is to provide a torsionally elastic member rigidly connected to both the spring member and the sprung member, the torsional elasticity thereof permitting oscillation of said members about different axes.

The principle of the invention will be apparent from the following description of one illustrative form thereof taken in connection with the drawing annexed hereto in which:

Fig. 1 illustrates a plan view of the rear portion of a rear engine motor car embodying the invention;

Fig. 2 is a corresponding elevation partly in section taken along the line II—II of Fig. 1;

Fig. 3 is a section along the line III—III of Fig. 2 upon an enlarged scale.

The sprung member in the instance shown comprises one of the wheels 1 or 1' and one of the hollow wheel supporting axles 2 which are spherically journaled relative to the lid 3a of the axle housing 3. As is usual in such constructions, the driving axles (not shown) are connected to the differential mechanism within the housing 3 by universal joints. These joints and the center of oscillation of the axles are located at the points M, M'.

In the form shown, the numeral 4 may indicate the gear housing and the numeral 5 the driving motor. These members together with the axle housing 3 preferably comprise a unitary assembly which is attached to the longitudinal beams 7a, 7a'. 2a and 2a' indicate braces which are rigidly connected at their ends to the sprung members and to the rotary spring means respectively, said bracing or connecting members lying substantially in the direction of movement F. In the form shown, one end of the brace surrounds the half axle housing 2 and is firmly attached to the end flange 20a to which is rigidly attached sleeve 20. The other end of the bracing or connecting member which, as shown, is in the form of a spring leaf, surrounds the hub 16 and is firmly attached as by rivets 17a to the end flange 33a thereof. The connecting member need not necessarily be rigidly attached to said spring member and said sprung member but need only be attached for rotation therewith.

Within the hub 16 is located the end of a transverse torsion rod 8 which is secured against relative rotation thereto by splines 18 and against transverse motion by a head 8a which is preferably removable. The hub 16 is journaled in the end of a tubular cross beam 7b preferably by means of a rubber joint. For this purpose a rubber sleeve 15 under considerable precompression is located within the cross beam 7b near its outer end and the ring 15a carried by the hub 16. It is of course obvious that the ring 15a may be omitted, in which case, the rubber sleeve would be located directly between the hub 16 and cross beam 7b and, furthermore, that both the rubber sleeve 15 and the ring 15a may be omitted, in which event, the hub 16 would have a bearing directly within the cross beam 7b. The torsion bar 8 is shown as extending to the other side of the vehicle, it being held against rotation at its center by means of splines 18a formed upon the torsion bar and within the abutment 11 firmly fastened within the cross beam 7b.

Adjustment of both spring means may be secured by rotating the torsion rod 8 within the abutment 11 and individual adjustment may be secured at spline 18. In order to provide for a fine differential adjustment, the number of splines 18 is preferably chosen different from the number of splines 18a. The abutment 11 may be firmly fixed within the tubular cross beam 7b or it may be adjustably located therein by utilizing any known or suitable adjusting devices.

Upon upward movement of the wheel 1, as when the wheel is passing over an obstruction in the road, the torsion bar 8 is forcibly twisted in the direction of motion by the action thereon of the bracing or connecting member 2a. Since the wheel 1 cannot simultaneously swing about the turning point M and about the axis B of the hub 16 and spring bar 8, the resilient connecting member 2a is twisted since the end thereof attached to the axle is caused to swing about the line AM whereas its other end is constrained to oscillate about the axis B, B'. The connecting member 2a in addition to carrying the twisting moment referred to must necessarily also support longitudinal stresses due to traction and braking action incident to the operation of the vehicle. Furthermore, it must be resistant to bending stresses about horizontal transverse axes resulting from the reaction of the rotary spring 8. The connecting member 2a must therefore not only be resistant to longitudinal forces but also to bending stresses in addition to the twisting moments previously referred to. Since the spring leaf connecting member 2a is twisted during relative upward movement of the wheel it is effective in aid of the springing action and in addition to the numerous functions mentioned previously, it also performs the function of a spring.

Since the spring leaf is easily twisted, inaccuracies in location of the axle housing relative to the frame and other points of assembly are no longer important. Therefore, in addition to the simplified and cheapened construction, simplified assembly is also provided.

It is to be understood that the expressions "frame" or "chassis" as used in this application are not limited to those cases in which these elements are made separate or apart from the body or coachwork of the vehicle, but are to include such construction in which a frame or chassis are formed integrally with such body or coachwork.

It will be seen that the illustrative example of the invention shown and described will serve admirably to fulfill the objects stated above. The example shown is intended merely as illustrative and not as limiting since various changes and modifications may be made falling within the invention as defined by proper construction of the claims which follow.

What is claimed is:

1. A springing arrangement comprising a sprung member mounted for oscillation about a point, rotary spring means the axis of rotation of which does not pass through said point, and a torsionally elastic connecting member connected adjacent one of its ends for rotation with said sprung member and connected adjacent its other end for rotation with said spring means.

2. A springing arrangement according to claim 1 in which the sprung member comprises a swinging half axle.

3. A springing arrangement according to claim 1 in which the rotary spring means comprises a torsion bar.

4. A springing arrangement according to claim 1 in which the sprung member comprises a swinging half axle and in which the rotary spring means comprises a torsion bar.

5. A springing arrangement comprising a sprung member mounted for oscillation about a point, a torsionally elastic member connected adjacent one of its ends for oscillation with said sprung member and means for journaling its other end for oscillation about an axis which does not pass through said point.

6. A springing arrangement comprising a rotary spring means, a torsionally elastic member connected for rotation with said spring means, a sprung member mounted for oscillation about an axis which passes through the point of attachment of said elastic member to said spring means but not coinciding with the axis of rotation of said rotary spring means, said elastic member being attached at its other end for rotation with said sprung member.

7. A springing arrangement according to claim 6 in which the elastic member comprises a spring leaf arranged edgewise to the direction of thrust of said spring means.

8. A springing arrangement for vehicles comprising a frame, a rotary spring means, a torsionally elastic member connected for rotation with said spring means, a sprung member mounted for oscillation about an axis which passes through the point of attachment of said elastic member to said spring means but not coinciding with the axis of rotation of said rotary spring means, said elastic member being attached at its other end for rotation with said sprung member, said rotary spring means comprising a torsion bar one end of which is fixed relative to said frame.

9. A springing arrangement according to claim 1 in which the ends of the elastic member are rigidly attached to the sprung member and to the spring means.

10. A springing arrangement according to claim 5 in which the elastic member is rigidly attached to said sprung member.

11. A springing arrangement according to claim 1 in which the spring member is journaled elastically as upon a rubber element.

12. A springing arrangement according to claim 1 in which the ends of the elastic member surround and are rigidly attached to the sprung member and to the spring means.

KARL RABE.